US010905125B2

(12) United States Patent
Kramer

(10) Patent No.: US 10,905,125 B2
(45) Date of Patent: Feb. 2, 2021

(54) BIOCIDAL COMPOSITIONS AND METHOD OF TREATING WATER USING THEREOF

(71) Applicant: BWA WATER ADDITIVES UK LIMITED, Manchester (GB)

(72) Inventor: Jeffrey Kramer, Snellville, GA (US)

(73) Assignee: ITALMATCH CHEMICALS GB LTD., Manchester (GB)

( * ) Notice: Subject to any disclaimer, the term of this patent is extended or adjusted under 35 U.S.C. 154(b) by 0 days.

(21) Appl. No.: 14/513,768

(22) Filed: Oct. 14, 2014

(65) Prior Publication Data
US 2016/0100582 A1    Apr. 14, 2016

(51) Int. Cl.
*A01N 59/00* (2006.01)
*A01N 57/20* (2006.01)
*C02F 1/76* (2006.01)
*C02F 1/50* (2006.01)

(52) U.S. Cl.
CPC .............. *A01N 59/00* (2013.01); *A01N 57/20* (2013.01); *C02F 1/50* (2013.01); *C02F 1/76* (2013.01)

(58) Field of Classification Search
CPC ........ A01N 59/00; A01N 57/20; A01N 57/34; C02F 1/76; C02F 1/50
See application file for complete search history.

(56) References Cited

U.S. PATENT DOCUMENTS

| | | | |
|---|---|---|---|
| 3,281,365 | A | 10/1966 | Moedritzer |
| 4,835,143 | A | 5/1989 | Donofrio et al. |
| 4,874,526 | A | 10/1989 | Grade et al. |
| 5,063,213 | A | 11/1991 | Whitekettle et al. |
| 5,063,214 | A | 11/1991 | Whitekettle et al. |
| 5,063,218 | A | 11/1991 | Whitekettle et al. |
| 5,102,874 | A | 4/1992 | Lintner et al. |
| 5,376,731 | A | 12/1994 | Kerr et al. |
| 5,741,757 | A | 4/1998 | Cooper et al. |
| 6,241,898 | B1 | 6/2001 | Wright et al. |
| 6,419,879 | B1 | 7/2002 | Cooper et al. |
| 6,471,974 | B1 | 10/2002 | Rees et al. |
| 6,478,972 | B1 | 11/2002 | Shim et al. |
| 6,669,904 | B1 | 12/2003 | Yang et al. |
| 2005/0061753 | A1 | 3/2005 | Dickinson |
| 2006/0006121 | A1 | 1/2006 | Simpson et al. |
| 2006/0032823 | A1 | 2/2006 | Harrison et al. |
| 2006/0113251 | A1* | 6/2006 | McGuire ................... C02F 9/00 210/652 |
| 2007/0012632 | A1 | 1/2007 | Simons |
| 2007/0102359 | A1 | 5/2007 | Lombardi et al. |
| 2009/0050320 | A1* | 2/2009 | Collins |
| 2009/0229827 | A1* | 9/2009 | Bryant ...................... C09K 8/54 166/308.1 |
| 2010/0160449 | A1 | 6/2010 | Rovison, Jr. et al. |
| 2010/0200239 | A1 | 8/2010 | Aften |
| 2010/0226874 | A1* | 9/2010 | Kramer ................. A01N 57/34 424/78.37 |
| 2012/0024794 | A1* | 2/2012 | Fischmann T. ........ B01D 21/30 210/665 |
| 2012/0178722 | A1 | 7/2012 | Yin |
| 2012/0223022 | A1 | 9/2012 | Hassler et al. |
| 2012/0285693 | A1 | 11/2012 | Mirakyan et al. |
| 2014/0030306 | A1 | 1/2014 | Polizzotti et al. |
| 2014/0166588 | A1 | 6/2014 | Fischmann |
| 2014/0194335 | A1* | 7/2014 | Gu ............................ C02F 1/50 510/188 |
| 2014/0301984 | A1 | 10/2014 | Corrin et al. |
| 2015/0056648 | A1* | 2/2015 | Tidwell .................... C12Q 1/18 435/32 |
| 2015/0225235 | A1 | 8/2015 | McIlwaine et al. |

FOREIGN PATENT DOCUMENTS

| | | |
|---|---|---|
| EP | 0479465 A2 | 4/1992 |
| EP | 0681995 A1 | 10/1994 |
| GB | 2354771 A | 4/2001 |
| JP | 10273408 A | 10/1998 |
| JP | 2010167320 | 5/2010 |
| WO | 9104668 A1 | 4/1991 |
| WO | 0142145 A1 | 6/2001 |
| WO | 03031347 A1 | 4/2003 |
| WO | 03073848 A1 | 9/2003 |
| WO | 2005123607 A1 | 12/2005 |
| WO | 2010100470 A2 | 9/2010 |

OTHER PUBLICATIONS

Augustinovic, et al., Oilfield Review Summer 2012;24, No. 2, 4-17. (Year: 2012).*
Braustein et al., Am.J.Clin. Pathol., vol. 64, 1976, 702-705 (Year: 1976).*
U.S. Appl. No. 14/513,693, filed Oct. 14, 2014, Kramer.
U.S. Appl. No. 14/513,735, filed Oct. 14, 2014, Kramer.
U.S. Appl. No. 14/673,419, filed Mar. 30, 2015, Kramer et al.
U.S. Appl. No. 14/840,674, filed Aug. 31, 2015, Kramer.
U.S. Appl. No. 14/870,951, filed Sep. 30, 2015, Kramer.
U.S. Appl. No. 14/872,399, filed Oct. 1, 2015, Kramer.
U.S. Appl. No. 14/874,686, filed Oct. 5, 2015, Kramer et al.
U.S. Appl. No. 14/878,240, filed Oct. 8, 2015, Kramer et al.
BWA Water Additives, "Product Label for Bellacide © 303," http://www.kellysolutions.com/erenewals/documentsubmit/KellyData%5COK%5Cpesticide%5CProduct%20Labe1%5C83451%5C83451-20%5C83451-20 Bellacide 303 6 16 2011_2_54_43_PM.pdf.

(Continued)

*Primary Examiner* — Robert S Cabral

(74) *Attorney, Agent, or Firm* — McNees Wallace & Nurick LLC

(57) ABSTRACT

The present invention relates to water treatment, In one example, there is provided a method of treating an aqueous system to inhibit growth of one or more micro-organisms therein and/or to reduce the number of live micro-organisms therein. The method includes adding treatment agents to an aqueous system wherein said treatment agents include:

(a) a phosphonium compound; and
(b) a hypohalite compound.

16 Claims, No Drawings

(56) References Cited

OTHER PUBLICATIONS

BWA Water Additives, " Product Information for Bellacide ® 303—Multi-purpose Non-oxidizing Biocide for Industrial Water Systems," http://www.wateradditives.com/Repository/Files/BWA_Bellacide_303_GP_WF_-_AsiaPac_O.pdf.

Bwa Water Additives, "Technical Data for Bellacide © 303—Multi-purpose Non-oxidizing Biocide for Industrial Water Systems," http://www.wateradditives.com/Repository/Files/BWA_Bellacide_303_TI_WF_AsiaPac.pdf.

Kull, F C. et al., "Mixtures of Quaternary Ammonium Compounds and Long-chain Fatty Acids as Antifungal Agents," Applied Microbiology, Nov. 1961, pp. 538-541, vol. 9, No. 6, The American Society for Microbiology by the Williams & Wilkins Company, Baltimore, MD.

May, Oscar W., "Polymeric Antimicrobial Agents," Disinfection, Sterilization, and Preservation, Chapter 18, Jan. 1, 1991, pp. 322-333, Philadelphia, Lea & Febiger, US.

Rembaum, A, "Biological Activity of Ionene Polymers," Applied Polymer Symposium, 1973, pp. 299-317, No. 22, J. Wiley & Sons, Inc., New York, NY.

U.S. Appl. No. 12/399,300, Final Office Action dated Feb. 23, 2016, 14 pages.

U.S. Appl. No. 14/513,693, Non-Final Office Action dated Feb. 26, 2016, 11 pages.

Giri, Jitendra et al., "Effluents from Paper and Pulp Industries and their impact on soil properties and chemical composition of plants in Uttarakhand, India," Journal of Environment and Waste Management, May 2014, pp. 026-032, vol. 1, No. 1, www.premierpublishers.org.

Jeffrey F. Kramer, et al. A New High Performance Quaternary Phosphonium Biocide for Microbiological Control in Oilfield Water Systems, Paper No. 08660, NACE International Corrosion 2008 Conference & Expo, 2008.

Akyon, Benay. Biological Treatment of Hydraulic Fracturing Produced Water, Dissertation, Mar. 23, 2017.

Kim, Young-Ju, et al. Isolation and Culture Conditions of a *Klebsiella pneumoniae* Strain That Can Utilize Ammonium and Nitrate Ions Simultaneously with Controlled Iron and Molybdate Ion Concentrations, Biosci. Biotechnol. Biochem., 66 (5), 996-1001, 2002.

McCoy, "Microbiology of Cooling Water", Chemical Publishing Co., New York, NY, pp. 76-77 (1980).

Liu, Na, "Characterization and Identification of SRB and its Control Method", Issue No. 07 of Engineering Science and Technology I Collection, China Excellent Master's Thesis Full-text Database, Jul. 15, 2013.

\* cited by examiner

BIOCIDAL COMPOSITIONS AND METHOD OF TREATING WATER USING THEREOF

FIELD OF THE INVENTION

The present invention relates to water treatment, particularly though not exclusively, to methods of treating aqueous systems to inhibit growth of micro-organisms.

BACKGROUND TO THE INVENTION

The presence and growth of micro-organisms in aqueous systems, especially in industrial water systems, is a concern. Examples of industrial water systems where micro-organisms are a concern include cooling water systems, pulping and papermaking systems and oil and gas field water systems.

The presence of micro-organisms in industrial water systems may result in the formation of deposits on system surfaces. These deposits or slime can give rise to various problems. In cooling water systems, slime may restrict water flow, reduce heat transfer efficiency, cause corrosion and may be aesthetically unappealing especially if algae are present due to their visible green pigmentation. Corrosion can also occur in industrial water systems in the absence of visible slime through the action of micro-organisms.

In pulp and paper mill systems, slime formed by micro-organisms may cause fouling, plugging, or corrosion of the system. The slime may also break loose and become entrained in the paper produced causing blemishes, holes, tears, and odour in the finished product. The end result may therefore be unusable product and wasted output.

Slime can also be a problem in oil and gas field water systems and may cause energy losses due to increased fluid frictional resistance, formation plugging and corrosion. The slime may harbour a mixture of aerobic and anaerobic bacteria that are responsible for the production of hydrogen sulfide gas. The hydrogen sulfide may cause souring of oil and gas which may reduce the quality of these products and increase treatment costs.

*Pseudomonas aeruginosa* bacteria are commonly present in air, water and soil. These bacteria continually contaminate open cooling water systems, pulping and papermaking systems and oil and gas field water systems and are among the most common slime formers. Slime may be viewed as being a mass of cells stuck together by the cementing action of the gelatinous secretions around each cell. The slime entraps other debris, restricts water flow and heat transfer and may serve as a site for corrosion.

*Chlorella vulgaris* algae are also commonly present in air, water and soil. These algae continually contaminate open cooling water systems and their growth turns the water and surfaces in these systems green. They also provide a food source for bacteria, which can stimulate slime formation, and protozoa which can harbour the pathogenic bacterium *Legionella pneumophila*.

A known method of controlling microbial growth in aqueous systems is to use biocides. While biocides are known to inhibit microbial growth the biocidal effect is generally of limited duration. The effectiveness of known biocides may be rapidly reduced as a result of exposure to negative influences. Negative influences may include temperature, pH or reaction with ingredients present in the system which neutralizes their biocidal effect. Therefore, the use of such biocides may involve continuous or frequent addition and their application at multiple sites or zones in the system to be treated. The cost of the biocide treatment and the labour costs associated with the application of known biocides may therefore be significant.

Known biocides are also highly toxic in the quantities known to be required for effective control of microbial populations. As a result, the amount of biocides that can be safely discharged into the environment may be limited by environmental regulations. Therefore, the need exists for improved methods for controlling microbial growth in aqueous systems.

As noted above, known biocides have a number of limitations including the large quantities of biocides which typically have to be used to achieve the desired biocidal effect and the potential harmful effects on the environment of biocides and therefore reducing the amount necessary for control and thus the quantity released to the environment has many benefits.

Accordingly, the present invention aims to address at least one disadvantage associated with the prior art whether discussed herein or otherwise.

SUMMARY OF THE INVENTION

According to the present invention there is provided a method of treating an aqueous system as set forth in the appended claims. Other features of the invention will be apparent from the claims, and the description which follows.

According to a first aspect of the present invention there is provided a method of treating an aqueous system to inhibit growth of one or more micro-organisms therein and/or to reduce the number of live micro-organisms therein, wherein the method comprises adding treatment agents to an aqueous system and wherein said treatment agents comprise:
(a) a phosphonium compound; and
(b) a hypohalite compound.

Suitably, the method comprises treating an aqueous system to inhibit growth of anaerobic bacteria and/or to reduce the number of live anaerobic bacteria therein. Suitably, the method comprises treating an aqueous system to inhibit growth of facultative anaerobic bacteria and/or to reduce the number of live facultative anaerobic bacteria therein. Suitably, the method comprises treating an aqueous system to inhibit growth of aerobic bacteria and/or to reduce the number of live aerobic bacteria therein.

The aqueous system to be treated may comprise constituents other than water. The aqueous system to be treated may alternatively consist of water. Suitably the aqueous system comprises a mixture of water and other constituents. The aqueous system may contain oil. The aqueous system may comprise an oil and water emulsion. The aqueous system may comprise solids. The aqueous system may comprise suspended solids. The aqueous system may comprise dissolved solids. The aqueous system may comprise one or more salts, for example sodium chloride.

Suitably, the method comprises a method of treating an aqueous system comprising dissolved solids.

Suitably, the method comprises treating an aqueous system having a total dissolved solids (TDS) of 1000 mg $l^{-1}$ or greater. Suitably, the aqueous system has a total dissolved solids (TDS) of at least 2000 mg $l^{-1}$, for example at least: 3000 mg $l^{-1}$; 4000 mg $l^{-1}$; 5000 mg $l^{-1}$; 6000 mg $l^{-1}$; 7000 mg $l^{-1}$; 8000 mg $l^{-1}$; 9000 mg $l^{-1}$; or 10,000 mg $l^{-1}$.

Suitably, the method comprises treating an aqueous system having a total dissolved solids (TDS) of 10,000 mg $l^{-1}$ or greater. Suitably, the aqueous system has a total dissolved solids (TDS) of at least 11,000 mg $l^{-1}$, for example at least: 12,000 mg $l^{-1}$; for example at least: 13,000 mg $l^{-1}$; 14,000 mg $l^{-1}$; 15,000 mg $l^{-1}$; 16,000 mg $l^{-1}$; 17,000 mg $l^{-1}$; 18,000 mg $l^{-1}$; 19,000 mg $l^{-1}$; or 20,000 mg $l^{-1}$.

Suitably, the method comprises treating an aqueous system having a total dissolved solids (TDS) of 20,000 mg $l^{-1}$ or greater. Suitably, the aqueous system has a total dissolved solids (TDS) of at least 21,000 mg $l^{-1}$, for example at least: 22,000 mg $l^{-1}$; for example at least: 23,000 mg $l^{-1}$; 24,000 mg $l^{-1}$; 25,000 mg $l^{-1}$; 26,000 mg $l^{-1}$; 27,000 mg $l^{-1}$; 28,000 mg $l^{-1}$; 29,000 mg $l^{-1}$; or 30,000 mg $l^{-1}$.

Suitably, the method comprises treating an aqueous system having a total dissolved solids (TDS) of 30,000 mg $l^{-1}$ or greater. Suitably, the aqueous system has a total dissolved solids (TDS) of at least 31,000 mg $l^{-1}$, for example at least: 32,000 mg $l^{-1}$; for example at least: 33,000 mg $l^{-1}$; 34,000 mg $l^{-1}$; 35,000 mg $l^{-1}$; 36,000 mg $l^{-1}$; 37,000 mg $l^{-1}$; 38,000 mg $l^{-1}$; 39,000 mg $l^{-1}$; or 40,000 mg $l^{-1}$.

The method may comprise treating an aqueous system having a total dissolved solids (TDS) of 50,000 mg $l^{-1}$ or greater. The aqueous system may have a total dissolved solids (TDS) of at least 60,000 mg $l^{-1}$, for example at least: 70,000 mg $l^{-1}$; 80,000 mg $l^{-1}$; 90,000 mg $l^{-1}$; 100,000 mg $l^{-1}$; 110,000 mg $l^{-1}$; 120,000 mg $l^{-1}$; 130,000 mg $l^{-1}$; 140,000 mg $l^{-1}$; 150,000 mg $l^{-1}$; 160,000 mg $l^{-1}$; 170,000 mg $l^{-1}$; 180,000 mg $l^{-1}$; 190,000 mg $l^{-1}$; 200,000 mg $l^{-1}$; 210,000 mg $l^{-1}$; 220,000 mg $l^{-1}$; 230,000 mg $l^{-1}$; 240,000 mg $l^{-1}$; or 250,000 mg $l^{-1}$.

Suitably, the method comprises treating an aqueous system having a total dissolved solids (TDS) of 250,000 mg $l^{-1}$ or less. The aqueous system may have a total dissolved solids (TDS) of no more than 240,000 mg $l^{-1}$, for example no more than 230,000 mg $l^{-1}$; 220,000 mg $l^{-1}$; 210,000 mg $l^{-1}$; 200,000 mg $l^{-1}$; 190,000 mg $l^{-1}$; 180,000 mg $l^{-1}$; 170,000 mg $l^{-1}$; 160,000 mg $l^{-1}$; 150,000 mg $l^{-1}$; 140,000 mg $l^{-1}$; 130,000 mg $l^{-1}$; 120,000 mg $l^{-1}$; or 110,000 mg $l^{-1}$.

Suitably, the method comprises treating an aqueous system having a total dissolved solids (TDS) of 100,000 mg $l^{-1}$ or less. The aqueous system may have a total dissolved solids (TDS) of no more than 90,000 mg $l^{-1}$, for example no more than 80,000 mg $l^{-1}$; 70,000 mg $l^{-1}$; 60,000 mg $l^{-1}$; 50,000 mg $l^{-1}$; or 40,000 mg $l^{-1}$.

Suitably, the method comprises treating an aqueous system having a total dissolved solids (TDS) of from 10,000 mg $l^{-1}$ to 250,000 mg $l^{-1}$. Suitably, the method comprises treating an aqueous system having a total dissolved solids (TDS) of from 10,000 mg $l^{-1}$ to 100,000 mg $l^{-1}$. Suitably, the aqueous system has a total dissolved solids (TDS) of from 20,000 mg $l^{-1}$ to 100,000 mg $l^{-1}$, for example from 25,000 mg $l^{-1}$ to 100,000 mg $l^{-1}$. Suitably, the aqueous system has a total dissolved solids (TDS) of from 30,000 mg $l^{-1}$ to 100,000 mg $l^{-1}$. Suitably, the method comprises treating an aqueous system having a total dissolved solids (TDS) of from 20,000 mg $l^{-1}$ to 80,000 mg $l^{-1}$, for example from 25,000 mg $l^{-1}$ to 80,000 mg $l^{-1}$. Suitably, the method comprises treating an aqueous system having a total dissolved solids (TDS) of from 30,000 mg $l^{-1}$ to 80,000 mg $l^{-1}$.

Suitably, the method comprises treating an aqueous system to inhibit the growth of a plurality of different micro-organisms.

Suitably, the method comprises treating an aqueous system to prevent the growth of one or more micro-organisms. Suitably, the method comprises treating an aqueous system to prevent the growth of a plurality of different micro-organisms.

Suitably, the method comprises treating an aqueous system to kill one or more micro-organisms. Suitably, the method comprises treating an aqueous system to kill a plurality of different micro-organisms.

Suitably, the method comprises treating an aqueous system to inhibit or prevent the growth of one or more micro-organisms therein and/or to reduce the number of live micro-organisms therein, wherein said micro-organisms are selected from bacteria, fungi and algae. Suitably, the method comprises a method of inhibiting growth of bacteria and/or killing bacteria. Suitably, the method comprises a method of inhibiting growth of fungi and/or killing fungi. Suitably, the method comprises a method of inhibiting growth of algae and/or killing algae.

Suitably, the method comprises treating an aqueous system to inhibit or prevent the growth of anaerobic micro-organisms. Suitably, the method comprises treating an aqueous system to kill anaerobic micro-organisms. Suitably, the method comprises treating an aqueous system to inhibit or prevent the growth of anaerobic bacteria. Suitably, the method comprises treating an aqueous system to kill anaerobic bacteria. Suitably, the method comprises treating an aqueous system to inhibit or prevent the growth of facultative anaerobic bacteria. Suitably, the method comprises treating an aqueous system to kill facultative anaerobic bacteria.

Suitably, the method comprises treating an aqueous system to inhibit or prevent the growth of aerobic micro-organisms. Suitably, the method comprises treating an aqueous system to kill aerobic micro-organisms. Suitably, the method comprises treating an aqueous system to inhibit or prevent the growth of aerobic bacteria. Suitably, the method comprises treating an aqueous system to kill aerobic bacteria.

Suitably, the method comprises treating an aqueous system to inhibit or prevent the growth of anaerobic and aerobic micro-organisms. Suitably, the method comprises treating an aqueous system to kill anaerobic and aerobic micro-organisms. Suitably, the method comprises treating an aqueous system to inhibit or prevent the growth of anaerobic and aerobic bacteria. Suitably, the method comprises treating an aqueous system to kill anaerobic and aerobic bacteria.

The method may comprise a method of inhibiting growth of gram-positive aerobic bacteria, gram-positive facultative anaerobic bacteria, gram-negative aerobic bacteria, gram-negative facultative anaerobic bacteria, gram-positive anaerobic bacteria and/or gram-negative anaerobic bacteria. The method may comprise a method of inhibiting growth of mold and/or yeast. The method may comprise a method of inhibiting the growth of blue green algae and/or green algae. Suitably, the method comprises a method of inhibiting the growth of gram-negative aerobic bacteria, gram-negative facultative anaerobic bacteria, gram-negative anaerobic bacteria, and green algae. Suitably, the method comprises inhibiting the growth of *Pseudomonas aeruginosa* bacteria in an aqueous system. Suitably, the method comprises inhibiting the growth of *Enterobacter aerogenes* bacteria in an aqueous system. Suitably, the method comprises inhibiting the growth of *Desulfovibrio vulgaris* bacteria in an aqueous system. Suitably, the method comprises inhibiting the growth of *Chlorella vulgaris* algae in an aqueous system.

Suitably, the method comprises adding a phosphonium compound treatment agent and a hypohalite compound treatment agent to an aqueous system such that a Log 10 reduction of 4 or greater in an anaerobe culture is obtained after a contact time of 10 minutes. Suitably, the method comprises obtaining a Log 10 reduction of 5 or greater to an anaerobe culture after a contact time of 10 minutes. Suitably, the method comprises obtaining a Log 10 reduction of 6 or greater to an anaerobe culture after a contact time of 10 minutes.

Suitably, the method comprises adding a phosphonium compound treatment agent and a hypohalite compound treatment agent to an aqueous system such that a complete kill of an anaerobe culture is obtained after a contact time of 30 minutes. Suitably, the method comprises obtaining a Log 10 reduction of 5 or greater to an anaerobe culture after a contact time of 30 minutes. Suitably, the method comprises obtaining a Log 10 reduction of 6 or greater to an anaerobe culture after a contact time of 30 minutes.

Suitably, the method comprises adding a phosphonium compound treatment agent and a hypohalite compound treatment agent to an aqueous system such that a Log 10 reduction of 4 or greater in a facultative anaerobe culture is obtained after a contact time of 10 minutes. Suitably, the method comprises obtaining a Log 10 reduction of 5 or greater to a facultative anaerobe culture after a contact time of 10 minutes. Suitably, the method comprises obtaining a Log 10 reduction of 6 or greater to a facultative anaerobe culture after a contact time of 10 minutes.

Suitably, the method comprises adding a phosphonium compound treatment agent and a hypohalite compound treatment agent to an aqueous system such that a complete kill of a facultative anaerobe culture is obtained after a contact time of 30 minutes. Suitably, the method comprises obtaining a Log 10 reduction of 5 or greater to a facultative anaerobe culture after a contact time of 30 minutes. Suitably, the method comprises obtaining a Log 10 reduction of 6 or greater to a facultative anaerobe culture after a contact time of 30 minutes. The method may comprise obtaining a Log 10 reduction of 7 or greater to a facultative anaerobe culture after a contact time of 30 minutes. The method may comprise obtaining a Log 10 reduction of 8 or greater to a facultative anaerobe culture after a contact time of 30 minutes.

Suitably, the method comprises adding compound (a) and compound (b) to the aqueous system such that they are added in a combined amount of from 0.1 to 1000 parts by weight per one million parts by weight of said aqueous system (ppm), for example from 0.1 to 100 ppm.

Suitably, the method comprises adding compound (a) and compound (b) to the aqueous system such that they are present in a combined amount of from 0.1 to 1000 parts by weight per one million parts by weight of said aqueous system (ppm), for example from 0.1 to 100 ppm.

As used herein, all references to ppm refer to parts per million by weight unless stated otherwise.

The method may comprise adding compound (a) and compound (b) to the aqueous system such that they are added in a combined amount of from 0.5 to 70 ppm. Suitably, the method comprises adding compound (a) and compound (b) to the aqueous system such that they are added in a combined amount of from 1 to 60 ppm. Suitably, the method comprises adding compound (a) and compound (b) to the aqueous system such that they are added in a combined amount of from 5 to 55 ppm.

Suitably, the method comprises adding a phosphonium compound treatment agent to an aqueous system in an amount of at least 0.1 ppm.

Suitably, the method comprises adding a phosphonium compound treatment agent to an aqueous system to provide a treated aqueous system comprising said phosphonium compound in an amount of at least 0.1 ppm.

Suitably, the method comprises adding a phosphonium compound to an aqueous system such that it is added in an amount of at least 0.2 ppm. Suitably, the method comprises adding a phosphonium compound to an aqueous system such that it is added in an amount of at least 0.3 ppm, for example at least: 0.4 ppm; 0.5 ppm; 0.6 ppm; 0.7 ppm; 0.8 ppm; 0.9 ppm; or 1.0 ppm.

Suitably, the method comprises adding a phosphonium compound to an aqueous system such that it is added in an amount of at least 1 ppm; for example at least 1.5 ppm; 2.0 ppm; 2.5 ppm; 3.0 ppm; 3.5 ppm; 4.0 ppm; 4.5 ppm; 5.0 ppm; 5.5 ppm; or 6.0 ppm. The method may comprise adding a phosphonium compound to an aqueous system such that it is added in an amount of at least 6 ppm, for example at least: 7 ppm; 8 ppm; 9 ppm; 10 ppm; 11 ppm; 12 ppm; 13 ppm; 14 ppm; 15 ppm; 16 ppm; 17 ppm; 18 ppm; 19 ppm; 20 ppm; 21 ppm; 22 ppm; 23 ppm; 24 ppm or 25 ppm. The method may comprise adding a phosphonium compound to an aqueous system such that it is added in an amount of at least 25 ppm, for example at least: 30 ppm; 35 ppm; 40 ppm; 45 ppm; or 50 ppm. The method may comprise adding a phosphonium compound to an aqueous system such that it is added in an amount of at least 55 ppm, for example at least: 60 ppm; 65 ppm; 70 ppm; 75 ppm; 80 ppm; 85 ppm; 90 ppm; 95 ppm or 100 ppm.

Suitably, the method comprises adding a phosphonium compound to an aqueous system such that it is present in an amount of at least 0.2 ppm. Suitably, the method comprises adding a phosphonium compound to an aqueous system such that it is present in an amount of at least 0.3 ppm, for example at least: 0.4 ppm; 0.5 ppm; 0.6 ppm; 0.7 ppm; 0.8 ppm; 0.9 ppm; or 1.0 ppm. Suitably, the method comprises adding a phosphonium compound to an aqueous system such that it is present in an amount of at least 1 ppm; for example at least 1.5 ppm; 2.0 ppm; 2.5 ppm; 3.0 ppm; 3.5 ppm; 4.0 ppm; 4.5 ppm; 5.0 ppm; 5.5 ppm; or 6.0 ppm. The method may comprise adding a phosphonium compound to an aqueous system such that it is present in an amount of at least 6 ppm, for example at least: 7 ppm; 8 ppm; 9 ppm; 10 ppm; 11 ppm; 12 ppm; 13 ppm; 14 ppm; 15 ppm; 16 ppm; 17 ppm; 18 ppm; 19 ppm; 20 ppm; 21 ppm; 22 ppm; 23 ppm; 24 ppm or 25 ppm. The method may comprise adding a phosphonium compound to an aqueous system such that it is present in an amount of at least 25 ppm, for example at least: 30 ppm; 35 ppm; 40 ppm; 45 ppm; or 50 ppm. The method may comprise adding a phosphonium compound to an aqueous system such that it is present in an amount of at least 55 ppm, for example at least: 60 ppm; 65 ppm; 70 ppm; 75 ppm; 80 ppm; 85 ppm; 90 ppm; 95 ppm or 100 ppm.

Suitably, the method comprises adding a phosphonium compound treatment agent to an aqueous system to provide a treated aqueous system comprising said phosphonium compound added in an amount of 5.5 to 7.0 ppm, for example 6.0 to 6.5 ppm, for example 6.25 ppm. Suitably, the method comprises adding a phosphonium compound treatment agent to an aqueous system to provide a treated aqueous system comprising said phosphonium compound added in an amount of 10 to 15 ppm, for example 12 to 13 ppm for example 12.5 ppm. Suitably, the method comprises adding a phosphonium compound treatment agent to an aqueous system to provide a treated aqueous system comprising said phosphonium compound added in an amount of 20 to 30 ppm, for example 23 to 27 ppm, for example 25 ppm. Suitably, the method comprises adding a phosphonium compound treatment agent to an aqueous system to provide a treated aqueous system comprising said phosphonium compound added in an amount of 45 to 55 ppm, for example 48 to 52 ppm, for example 50 ppm.

Suitably, the method comprises adding a phosphonium compound treatment agent to an aqueous system in an amount of not more than 150 ppm; for example not more than 120 ppm.

Suitably, the method comprises adding a phosphonium compound treatment agent to an aqueous system to provide a treated aqueous system comprising said phosphonium compound in an amount of not more than 150 ppm; for example not more than 120 ppm.

Suitably, the method comprises adding a phosphonium compound treatment agent to an aqueous system to provide a treated aqueous system comprising said phosphonium compound added in an amount of not more than 110 ppm. Suitably, the method comprises adding a phosphonium compound treatment agent to an aqueous system to provide a treated aqueous system comprising said phosphonium compound added in an amount of not more than 100 ppm.

Suitably, the method comprises adding a phosphonium compound treatment agent to an aqueous system to provide a treated aqueous system comprising said phosphonium compound in an amount of not more than 110 ppm. Suitably, the method comprises adding a phosphonium compound treatment agent to an aqueous system to provide a treated aqueous system comprising said phosphonium compound in an amount of not more than 100 ppm.

Suitably, the method comprises adding a phosphonium compound to an aqueous system such that it is added in an amount of not more than 95 ppm, for example not more than 90 ppm; 85 ppm; 80 ppm; 75 ppm; 70 ppm; 65 ppm; 60 ppm; 55 ppm; or 50 ppm. The method may comprise adding a phosphonium compound to an aqueous system such that it is added in an amount of not more than 50 ppm, for example not more than 45 ppm; 40 ppm; 35 ppm; 30 ppm; 25 ppm; 20 ppm; 15 ppm; or 10 ppm.

Suitably, the method comprises adding a phosphonium compound to an aqueous system such that it is present in an amount of not more than 95 ppm, for example not more than 90 ppm; 85 ppm; 80 ppm; 75 ppm; 70 ppm; 65 ppm; 60 ppm; 55 ppm; or 50 ppm. The method may comprise adding a phosphonium compound to an aqueous system such that it is present in an amount of not more than 50 ppm, for example not more than 45 ppm; 40 ppm; 35 ppm; 30 ppm; 25 ppm; 20 ppm; 15 ppm; or 10 ppm.

Suitably, the method comprises adding a hypohalite compound treatment agent to an aqueous system in an amount of at least 0.1 ppm.

Suitably, the method comprises adding a hypohalite compound treatment agent to an aqueous system to provide a treated aqueous system comprising said a hypohalite compound in an amount of at least 0.1 ppm.

Suitably, the method comprises adding a hypohalite compound to an aqueous system such that it is added in an amount of at least 0.2 ppm. Suitably, the method comprises adding a hypohalite compound to an aqueous system such that it is added in an amount of at least 0.3 ppm, for example at least: 0.4 ppm; 0.5 ppm; 0.6 ppm; 0.7 ppm; 0.8 ppm; 0.9 ppm; 1.0 ppm; 1.1 ppm; 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding a hypohalite compound to an aqueous system such that it is added in an amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm. Suitably, the method comprises adding a hypohalite compound to an aqueous system such that it is added in an amount of at least 5 ppm, for example at least: 10 ppm; 15 ppm; 20 ppm; 25 ppm; 30 ppm; 35 ppm; 40 ppm; 45 ppm; 50 ppm; 55 ppm; 60 ppm; 65 ppm; 70 ppm; 75 ppm; 80 ppm; 85 ppm; 95 ppm; or 100 ppm. Suitably, the method comprises adding a hypohalite compound to an aqueous system such that it is added in an amount of at least 110 ppm; for example at least 120 ppm; 130 ppm; 140 ppm; 150 ppm; 160 ppm; 170 ppm; 180 ppm; 190 ppm; 200 ppm; 210 ppm; 220 ppm; 230 ppm; 240 ppm or 250 ppm.

Suitably, the method comprises adding a hypohalite compound to an aqueous system such that free hypohalite is present in an amount of at least 0.2 ppm. Suitably, the method comprises adding a hypohalite compound to an aqueous system such that free hypohalite is present in an amount of at least 0.3 ppm, for example at least: 0.4 ppm; 0.5 ppm; 0.6 ppm; 0.7 ppm; 0.8 ppm; 0.9 ppm; 1.0 ppm; 1.1 ppm; 1.2 ppm; 1.3 ppm; 1.4 ppm; 1.5 ppm; 1.6 ppm; 1.7 ppm; 1.8 ppm; 1.9 ppm; or 2.0 ppm. The method may comprise adding a hypohalite compound to an aqueous system such that free hypohalite is present in an amount of at least 2.1 ppm, for example at least: 2.2 ppm; 2.3 ppm; 2.4 ppm; 2.5 ppm; 2.6 ppm; 2.7 ppm; 2.8 ppm; 2.9 ppm or 3.0 ppm.

Suitably, the method comprises adding sodium hypochlorite to an aqueous system such that the free sodium hypochlorite in said aqueous system is at least 0.1 ppm; for example at least: 0.2 ppm; 0.3 ppm; 0.4 ppm; 0.5 ppm; 0.6 ppm; 0.7 ppm; 0.8 ppm; 0.9 ppm; 1.0 ppm; 1.1 ppm; 1.2 ppm; 1.3 ppm; 1.4 ppm; 1.5 ppm; 1.6 ppm; 1.7 ppm; 1.8 ppm; 1.9 ppm; 2.0 ppm; 2.1 ppm; 2.2 ppm; 2.3 ppm; 2.4 ppm; 2.5 ppm; 2.6 ppm; 2.7 ppm; 2.8 ppm; 2.9 ppm or 3.0 ppm. Suitably, the method comprises adding sodium hypochlorite to an aqueous system such that the free sodium hypochlorite in said aqueous system is from 0.1 ppm to 5.0 ppm, for example from 0.1 ppm to 3.0 ppm.

Suitably, the method comprises adding sodium hypochlorite to an aqueous system such that the applied amount of sodium hypochlorite is at least 0.1 ppm; for example at least: 10 ppm; 20 ppm; 30 ppm; 40 ppm; 50 ppm; 60 ppm; 70 ppm; 80 ppm; 90 ppm; 100 ppm; 110 ppm; 120 ppm; 130 ppm; 140 ppm; 150 ppm; 160 ppm; 170 ppm; 180 ppm; 190 ppm; 200 ppm; 210 ppm; 220 ppm; 230 ppm; 240 ppm; or 250 ppm. Suitably, the method comprises adding sodium hypochlorite to an aqueous system such that the applied amount of sodium hypochlorite is from 0.1 ppm to 300 ppm, for example from 10 ppm to 250 ppm, for example from 60 ppm to 250 ppm.

Suitably, the method comprises adding a hypohalite compound treatment agent to an aqueous system to provide a treated aqueous system comprising free hypohalite in an amount of 1.5 to 2.5 ppm for example 2.0 ppm.

Suitably, the method comprises adding a hypohalite compound treatment agent to an aqueous system to provide a treated aqueous system comprising free hypohalite in an amount of not more than 20 ppm.

Suitably, the method comprises adding a hypohalite compound treatment agent to an aqueous system in an amount of not more than 300 ppm, for example not more than 250 ppm.

Suitably, the method comprises adding a hypohalite compound to an aqueous system such that free hypohalite is present in an amount of not more than 15 ppm, for example not more than 10 ppm; 9 ppm; 8 ppm; 7 ppm; or 6 ppm. Suitably, the method comprises adding a hypohalite compound to an aqueous system such that free hypohalite is present in an amount of not more than 5.0 ppm; 4.5 ppm; 4.0 ppm; 3.5 ppm; or 3.0 ppm.

Suitably the method comprises adding a phosphonium compound treatment agent and a hypohalite compound treatment agent to an aqueous system in a weight ratio of from 1:0.5 to 1.0:50.0, for example 1.0:0.5 to 1.0:20.0.

As used herein, all ratios are weight ratios unless stated otherwise.

Suitably the method comprises adding a phosphonium compound treatment agent and a hypohalite compound treatment agent to an aqueous system in a weight ratio of from 1.0:0.5 to 1.0:10.0.

Suitably the method comprises adding a phosphonium compound treatment agent and a hypohalite compound treatment agent to an aqueous system in a ratio of at least 1.0:20.0, for example at least 1.0:10.0, for example at least 1:0:5.0.

Suitably the method comprises adding a phosphonium compound treatment agent and a hypohalite compound treatment agent to an aqueous system in a ratio of no more than 1.0:0.5, for example no more than 1.0:0.7.

Suitably the method comprises adding a phosphonium compound treatment agent and a hypohalite compound treatment agent to an aqueous system in a ratio of from 1.0:3.0 to 1.0:7.0, for example 1.0:5.6.

Suitably the method comprises adding a phosphonium compound treatment agent and a hypohalite compound treatment agent to an aqueous system in a ratio of from 1.0:2.0 to 1.0:4.0, for example 1.0:2.8.

Suitably the method comprises adding a phosphonium compound treatment agent and a hypohalite compound treatment agent to an aqueous system in a ratio of from 1.0:1.0 to 1.0:2.0, for example 1.0:1.4.

Suitably the method comprises adding a phosphonium compound treatment agent and a hypohalite compound treatment agent to an aqueous system in a ratio of from 1.0:0.5 to 1.0:1.0; for example 1.0:0.7.

The method may comprise adding a combination of phosphonium compounds (a) to an aqueous system. Suitably, the method comprises adding a single type of phosphonium compound (a) to an aqueous system.

Suitably, the method employs a phosphonium compound (a) having formula:

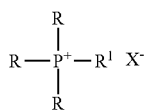

wherein each R is independently a $C_1$-$C_6$ alkyl group which is unsubstituted or substituted by a cyano, hydroxyl, esterified hydroxyl or aryl group;

$R^1$ represents a $C_8$-$C_{18}$ alkyl group which is substituted or unsubstituted; and X represents either chlorine or bromine.

Suitably, each R is a $C_1$-$C_6$ alkyl group. Suitably, each R is a $C_3$-$C_5$ alkyl group. Suitably each R is a butyl group.

Suitably $R^1$ represents a $C_8$-$C_{18}$ alkyl group. Suitably, R1 is a $C_{12}$-$C_{16}$ alkyl group. Suitably, $R^1$ is a tetradecyl group.

Suitably, X is chlorine.

Suitably, the method employs a phosphonium compound (a) which is a phosphonium chloride.

Suitably, the method comprises treating an aqueous system such that phosphonium chloride comprises greater than 50% of the total phosphonium compound(s) added to the aqueous system. Suitably, the method comprises treating an aqueous system such that phosphonium chloride comprises greater than 90% of the total phosphonium compound(s) added to the aqueous system, for example 99% or greater.

Suitably, the method comprises treating an aqueous system such that phosphonium chloride comprises greater than 50% of the total phosphonium compound(s) present in the aqueous system. Suitably, the method comprises treating an aqueous system such that phosphonium chloride comprises greater than 90% of the total phosphonium compound(s) present in the aqueous system, for example 99% or greater.

Suitably, the method employs a phosphonium chloride as the only phosphonium compound (a).

Suitably, the method comprises adding tri n-butyl n-tetradecyl phosphonium chloride (hereafter "TTPC") to the aqueous system. Suitably, the phosphonium compound (a) comprises TTPC. Suitably, the phosphonium compound (a) consists of TTPC.

Suitably, the method comprises adding an aqueous composition containing the phosphonium compound (a) to the aqueous system. Suitably, the method comprises adding an aqueous composition of TTPC to the aqueous system. The method may comprise adding an aqueous composition comprising 5% by weight of TTPC to the aqueous system. A suitable composition containing TTPC is available from BWA Water Additives and is sold under the trade name Bellacide 355 (an aqueous composition of TTPC and water consisting of water and 5% by weight of TTPC). The method may comprise adding an aqueous composition comprising 50% by weight of TTPC to the aqueous system. A suitable composition containing TTPC is available from BWA Water Additives and is sold under the trade name Bellacide 350 (an aqueous composition of TTPC and water consisting of water and 50% by weight of TTPC). Suitably, the method comprises treating an aqueous system such that TTPC comprises greater than 50% of the total phosphonium compound(s) added to the aqueous system. Suitably, the method comprises treating an aqueous system such that TTPC comprises greater than 90% of the total phosphonium compound(s) added to the aqueous system, for example 99% or greater.

Suitably, the method comprises treating an aqueous system such that TTPC comprises greater than 50% of the total phosphonium compound(s) present in the aqueous system. Suitably, the method comprises treating an aqueous system such that TTPC comprises greater than 90% of the total phosphonium compound(s) present in the aqueous system, for example 99% or greater.

Suitably, the method employs TTPC as the only phosphonium compound (a).

The method may comprise adding a combination of hypohalite compounds (b) to an aqueous system. Suitably, the method comprises adding a single type of hypohalite compound (b) to an aqueous system.

Suitably, the method employs a hypohalite compound (b) comprising a hypochlorite. Suitably, the hypohalite compound (b) consists of a hypochlorite.

Suitably, the method employs a hypohalite compound (b) comprising a sodium hypohalite. Suitably, the hypohalite compound (b) consists of a sodium hypohalite.

Suitably, the method employs a hypohalite compound (b) comprising sodium hypochlorite. Suitably, the hypohalite compound (b) consists of a sodium hypochlorite.

Suitably, the method employs a hypohalite compound (b) which is a sodium hypochlorite.

Suitably, the method comprises treating an aqueous system such that sodium hypochlorite comprises greater than 50% of the total hypohalite compound(s) added to the aqueous system. Suitably, the method comprises treating an aqueous system such that sodium hypochlorite comprises greater than 90% of the total hypohalite compound(s) added to the aqueous system, for example 99% or greater.

Suitably, the method comprises treating an aqueous system such that sodium hypochlorite comprises greater than 50% of the total hypohalite compound(s) present in the aqueous system. Suitably, the method comprises treating an aqueous system such that sodium hypochlorite comprises greater than 90% of the total hypohalite compound(s) present in the aqueous system, for example 99% or greater.

Suitably, the method employs sodium hypochlorite as the only hypohalite compound (b).

Suitably, the method employs a beneficial combination of compounds (a) and (b). The method may employ a synergistic mixture of compounds (a) and (b). Suitably, by "synergistic mixture" it is meant that the mixture of compounds (a) and (b) has a synergistic effect on the inhibition of growth of one or more biological organisms, preferably micro-organisms such as bacteria, fungi and/or algae and/or has a synergistic effect on reducing the number of one or more biological organisms, preferably micro-organisms such as bacteria, fungi and/or algae.

The method may comprise adding compound (a) and compound (b) to the aqueous system such that the aqueous system comprises a synergistic mixture of compounds (a) and (b).

The method may comprise adding compound (a) and compound (b) as a mixture to the aqueous system. The method may comprise adding a biocidal composition comprising compound (a) and compound (b) to the aqueous system. The method may comprise mixing compound (a) and compound (b) and adding the mixture to the aqueous system. Suitably, the method comprises adding compound (a) and compound (b) separately to the aqueous system and allowing or causing them to mix within the aqueous system.

Where the method comprises mixing compound (a) and compound (b) and adding the mixture to the aqueous system and/or adding compound (a) and compound (b) separately to the aqueous system and allowing or causing them to mix within the aqueous system then compounds (a) and (b) are preferably used in the form of aqueous compositions.

Suitably, compound (a) is used in the form of an aqueous composition comprising between 1% and 90% by weight of compound (a), for example between 1% and 60% by weight. Suitably, compound (a) is used in the form of an aqueous composition comprising between 1% and 10% by weight of compound (a), for example 5% by weight.

Suitably, compound (b) is used in the form of an aqueous composition comprising between 1% and 90% by weight of compound (b), for example between 1% and 20% by weight. Suitably, compound (b) is used in the form of an aqueous composition comprising between 1% and 10% by weight of compound (b), for example 5% by weight.

The method may comprise adding a stabilising agent to the aqueous system. The method may comprise adding a stabilised treatment agent to the aqueous system. The method may comprise adding a treatment agent comprising compound (a) or (b) and a stabiliser.

The method may comprise a method of treating an industrial water system. The method may comprise treating a cooling water system. The method may comprise treating a pulping and/or papermaking water system. The method may comprise treating an oil and/or gas field water system. The method may comprise treating an aqueous system to control the growth of bacterial and/or algal micro-organisms contained therein and/or which may become entrained in said system.

It has been found that the compositions and methods of utilisation of the present invention may in particular be efficacious in controlling acid producing facultative anaerobic bacteria and hydrogen sulphide producing anaerobic bacteria which may populate aqueous systems.

Surprisingly, it has been found that when treatment agent compounds (a) and (b) are combined the resulting combination may pose a higher degree of biocidal activity in an aqueous system than that of the individual compounds used alone. Because of the enhanced activity of the combination of treatment agent compounds, it may be possible for the total quantity of treatment agent added to an aqueous system to be reduced in comparison to a system using only one of said treatment agent compounds. In addition, the high degree of biocidal activity which is provided by each of the treatment agent compounds may be exploited without use of higher concentrations of each. The combination of TTPC and sodium hypochlorite may be particularly effective.

It has been found that the compositions and methods of utilisation of the present invention may in particular be efficacious in controlling the facultative anaerobic bacterium *Enterobacter aerogenes* and/or the anaerobic bacterium *Desulfovibrio vulgaris*, which may populate aqueous systems.

Surprisingly, the present inventor has found that mixtures of compounds (a) and (b) such as mixtures of tri-n-butyl n-tetradecyl phosphonium chloride (TTPC) and sodium hypochlorite are especially efficacious in controlling the growth of micro-organisms such as bacterial and algal microbes in aqueous systems comprising dissolved solids. The efficacy in relation to acid and sulphide producing bacteria is marked with certain selections of amounts and ratios of components and there is an unexpected synergistic relationship. It has been found that compositions are unexpectedly effective against anaerobes such as *Desulfovibrio vulgaris*. It has been found that compositions having a weight ratio of compound (a):compound (b) of from 1:0.5 to 1:50 may be particularly beneficial and may have a marked synergy in relation to facultative anaerobes such as *Enterobacter aerogenes*.

Surprisingly, the present inventor has also found that the selection of appropriate amounts and ratios of components provides for stable treated aqueous systems. Surprisingly it has been found that aqueous systems which are stable at a broad range of temperatures can be provided.

According to a second aspect of the present invention there is provided a method of treating an aqueous system comprising greater than 20,000 mg $l^{-1}$ total dissolved solids (TDS) to inhibit growth of one or more micro-organisms therein and/or to reduce the number of live micro-organisms therein, wherein the method comprises adding treatment agents to said aqueous system and wherein said treatment agents comprise:

(a) TTPC; and
(b) sodium hypochlorite.

The method of the second aspect may comprise any feature as described in relation to the first aspect except where such features are mutually exclusive.

According to a third aspect of the present invention there is provided an aqueous system incorporating a combination of:

(i) a phosphonium compound; and
(ii) a hypohalite compound.

Suitably, the aqueous system comprises greater than 20,000 mg $l^{-1}$ total dissolved solids (TDS).

Suitably, said treatment agent (a) comprises TTPC.

Suitably, said treatment agent (b) comprises sodium hypochlorite.

The aqueous system of the third aspect may comprise any feature as described in relation to one or more of the first and/or second aspects except where such features are mutually exclusive.

According to a fourth aspect of the present invention there is provided a method of inhibiting or preventing the growth of one or more micro-organisms in an aqueous media, wherein the method comprises adding treatment agents to an aqueous media and wherein said treatment agents comprise:

(a) a phosphonium compound; and (b) a hypohalite compound.

Suitably, the aqueous media comprises greater than 20,000 mg $l^{-1}$ total dissolved solids (TDS).

Suitably, said treatment agent (a) comprises TTPC.

Suitably, said treatment agent (b) comprises sodium hypochlorite.

The method of the fourth aspect may comprise any feature as described in relation to one or more of the first and/or second and/or third aspects except where such features are mutually exclusive.

According to a fifth aspect of the present invention there is provided an aqueous media incorporating a combination of:

(i) a phosphonium compound; and (ii) a hypohalite compound.

Suitably, the aqueous media comprises greater than 20,000 mg $l^{-1}$ total dissolved solids (TDS).

Suitably, said treatment agent (a) comprises TTPC.

Suitably, said treatment agent (b) comprises sodium hypochlorite.

The aqueous media of the fifth aspect may comprise any feature as described in relation to one or more of the first and/or second and/or third and/or fourth aspects except where such features are mutually exclusive.

According to a sixth aspect of the present invention there is provided a biocidal composition comprising a combination of:

(a) a phosphonium compound; and (b) a hypohalite compound.

Suitably, said treatment agent (a) comprises TTPC.

Suitably, said treatment agent (b) comprises sodium hypochlorite.

The biocidal composition of the sixth aspect may comprise any feature as described in relation to one or more of the first and/or second and/or third and/or fourth and/or fifth aspects except where such features are mutually exclusive.

DETAILED DESCRIPTION OF PREFERRED EMBODIMENTS

The present invention will now be illustrated by way of example with reference to the following preferred embodiments.

EXAMPLES

A suspension of *Desulfovibrio vulgaris* plus *Enterobacter aerogenes* bacteria containing from $1 \times \times 10^6$ to $1 \times 10^8$ cells/mL was prepared in sterile pH 7.5 phosphate buffer containing varying levels of sodium chloride to give the desired total dissolved solids (TDS) concentration. Aliquots of this suspension were dosed with the indicated concentrations of a phosphonium compound and a hypohalite compound with the concentrations being measured as ppm by weight of the stated compounds added to the dosed suspension. The mixtures were allowed to stand at room temperature. At the designated contact times, each mixture was sampled to determine the total number of viable cells of both *Desulfovibrio vulgaris* and *Enterobacter aerogenes* by serial 10-fold dilution into API RP 38 media vials and anaerobic acid producing media vials, respectively. The vials were incubated at 37° C. for 72 hours. Results were recorded as cells per millilitre.

Aqueous media inoculated with anaerobe and facultative anaerobe culture and having a TDS of 10,000 mg $l^{-1}$; 20,000 mg $l^{-1}$; or 30,000 mg $l^{-1}$ was treated with treatment agents comprising: (i) sodium hypochlorite; (ii) tri n-butyl n-tetradecyl phosphonium chloride (TTPC) or (iii) a combination of sodium hypochlorite and TTPC.

TTPC was used in the form of Bellacide 355, an aqueous composition of TTPC and water consisting of water and 5% by weight of TTPC available from BWA Water Additives.

Sodium hypochlorite was used in the form of Clorox, an aqueous composition of sodium hypochlorite and water consisting of water and 6% by weight sodium hypochlorite available from The Clorox Company.

The efficacy of the treatment agents was evaluated by measuring the Log 10 Reduction of the anaerobe *Desulfovibrio vulgaris* and the facultative anaerobe *Enterobacter aerogenes* [after contact times of 10 and 30 minutes as detailed in Table 1. For TTPC and sodium hypochlorite the stated ppm values relate to the amount added. The addition of 35 ppm sodium hypochlorite to the aqueous system provided 2 ppm of free sodium hypochlorite in the treated aqueous system.

TABLE 1

| Example | TDS (mg $l^{-1}$) | Contact time (minutes) | Treatment agent (ppm) TTPC | Sodium hypochlorite | Log10 Reduction Anaerobes | Log10 Reduction Facultative Anaerobes |
|---|---|---|---|---|---|---|
| 1 (comparative) | 10,000 | 30 | 25 | — | 6 | 6 |
| 2 (comparative) | 10,000 | 30 | 50 | — | 6 | 8 |
| 3 (comparative) | 20,000 | 30 | 25 | — | 3 | 0 |
| 4 (comparative) | 20,000 | 30 | 50 | — | 6 | 5 |
| 5 (comparative) | 30,000 | 30 | 50 | — | 0 | 0 |
| 6 (comparative) | 30,000 | 30 | — | 35 | 3 | 3 |
| 7 | 30,000 | 30 | 6.25 | 35 | 6 | 5 |
| 8 | 30,000 | 30 | 12.5 | 35 | 4 | 4 |
| 9 | 30,000 | 30 | 25 | 35 | 6 | 5 |
| 10 | 30,000 | 30 | 50 | 35 | 6 | 6 |
| 11 (comparative) | 30,000 | 10 | — | 35 | 5 | 2 |
| 12 | 30,000 | 10 | 6.25 | 35 | 6 | 5 |
| 13 | 30,000 | 10 | 12.5 | 35 | 6 | 6 |

TABLE 1-continued

| Example | TDS (mg l$^{-1}$) | Contact time (minutes) | Treatment agent (ppm) | | Log10 Reduction Anaerobes | Log10 Reduction Facultative Anaerobes |
|---|---|---|---|---|---|---|
| | | | TTPC | Sodium hypochlorite | | |
| 14 | 30,000 | 10 | 25 | 35 | 6 | 8 |
| 15 | 30,000 | 10 | 50 | 35 | 6 | 8 |

It can be seen from the Examples that with a TDS of 30,000 mg l-1 TTPC alone was ineffective against both the anaerobe *Desulfovibrio vulgaris* and the facultative anaerobe *Enterobacter aerogenes* after a contact time of 30 minutes. Sodium hypochlorite had some efficacy against both the anaerobe *Desulfovibrio vulgaris* and the Facultative Anaerobe *Enterobacter aerogenes* after contact times of 10 and 30 minutes and with a TDS of 30,000 mg l$^{-1}$. Surprisingly however, despite the fact that TTPC alone was ineffective at high levels of TDS, aqueous systems treated with a combination of TTPC and sodium hypochlorite exhibited greater reduction of both anaerobes and facultative anaerobes than those treated with sodium hypochlorite alone even with high TDS.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method comprising:
adding treatment agents to an aqueous system having a total dissolved solids (TDS) of 10,000 mg l$^{-11}$ or greater, wherein said treatment agents comprise a synergistic combination of:
(a) tri n-butyl n-tetradecyl phosphonium chloride (TTPC); and
(b) sodium hypochlorite;
wherein the synergistic combination of TTPC and sodium hypochlorite are added to the aqueous system in amounts configured to reduce the number of live *Desulfovibrio vulgaris* and *Enterobacter aerogenes* in the aqueous system;
wherein the amounts of the synergistic combination of the TTPC and the sodium hypochlorite are selected in a weight ratio of from 1:0.5 to 1:50;
wherein the amount of TTPC is at least 1 part by weight per one million parts by weight of said aqueous system (ppm) and the amount of sodium hypochlorite is at least 1 ppm; and
wherein the synergistic combination of the TTPC and the sodium hypochlorite shows greater performance of reducing the number of bacteria than the sum of said treatment agents' individual performance.

2. A method according to claim 1, wherein the method comprises treating an aqueous system having a TDS of 30,000 mg l$^{-1}$ or greater.

3. A method according to claim 1, wherein the amount of sodium hypochlorite is at least 10 ppm.

4. A method according to claim 1, wherein the amount of the sodium hypochlorite is selected such that the free sodium hypochlorite in said aqueous system is at least 0.1 ppm.

5. A method according to claim 1, wherein the synergistic combination of TTPC and sodium hypochlorite is selected in a combined amount of up to 1000 ppm.

6. A method according to claim 1, wherein the amounts of the synergistic combination of TTPC and sodium hypochlorite are selected in a weight ratio of from 1:0.5 to 1:20.

7. A method comprising:
adding treatment agents to an aqueous system having a total dissolved solids (TDS) greater than 20,000 mg l$^{-1}$, wherein said treatment agents comprise a synergistic combination of:
(a) tri n-butyl n-tetradecyl phosphonium chloride (TTPC); and
(b) sodium hypochlorite;
wherein the synergistic combination of TTPC and sodium hypochlorite are added to the aqueous system in amounts configured to reduce the number of live *Desulfovibrio vulgaris* and *Enterobacter aerogenes* in the aqueous system;
wherein the amount of the synergistic combination of TTPC and sodium hypochlorite are selected in a weight ratio of from 1:0.5 to 1:50;
wherein the amount of TTPC is at least 0.1 parts by weight per one million parts by weight of said aqueous system (ppm) and the amount of sodium hypochlorite is selected such that the free sodium hypochlorite in said aqueous system is at least 0.1 ppm; and
wherein the synergistic combination of TTPC and sodium hypochlorite shows greater performance of reducing the number of bacteria than the sum of said treatment agents' individual performance.

8. A method comprising:
adding treatment agents to an aqueous media having a total dissolved solids (TDS) of 10,000 mg l-1 or greater, wherein said treatment agents comprise a synergistic combination of:

(a) tri n-butyl n-tetradecyl phosphonium chloride (TTPC); and
(b) sodium hypochlorite;
wherein the synergistic combination of TTPC and sodium hypochlorite are added to the aqueous system in amounts configured to and/or reduce the number of live *Desulfovibrio vulgaris* and *Enterobacter aerogenes* in the aqueous system;
wherein the synergistic combination of the TTPC and the sodium hypochlorite is selected in a weight ratio of from 1:0.5 to 1:50;
wherein the amount of TTPC is at least 1 part by weight per one million parts by weight of said aqueous system (ppm) and the amount of sodium hypochlorite is selected such that the free sodium hypochlorite in said aqueous system is at least 0.1 ppm; and
wherein the synergistic combination of the TTPC and the sodium hypochlorite shows greater performance of reducing the number of bacteria than the sum of said treatment agents' individual performance.

9. A method according to claim 1, wherein the method comprises treating an aqueous system which contains oil.

10. A method according to claim 1, wherein the method comprises reducing the number of live *Desulfovibrio vulgaris* and *Enterobacter aerogenes*.

11. A method according to claim 1, wherein the method comprises treating an aqueous system having a TDS of 70,000 mg $l^{-1}$ or greater.

12. A method according to claim 1 further comprising selecting the amounts of the synergistic combination of TTPC and sodium hypochlorite to reduce the number of live *Desulfovibrio vulgaris* and *Enterobacter aerogenes* in the aqueous system.

13. A method according to claim 1, wherein the method comprises treating an aqueous system having a TDS of 30,000 mg $l^{-1}$ or greater and the amount of TTPC is from 1.0 to 50 ppm and the amount of sodium hypochlorite is from 1 ppm to 35 ppm.

14. A method according to claim 1, wherein the method comprises treating an aqueous system having a TDS of 30,000 mg $l^{-1}$ or greater and the amount of TTPC is not more than 50 ppm and the amount of sodium hypochlorite is not more than 250 ppm.

15. A method according to claim 14, wherein the synergistic combination of TTPC and sodium hypochlorite is configured to reduce the number of live *Desulfovibrio vulgaris* and *Enterobacter aerogenes* after a contact time of 30 minutes in the aqueous system by a Log 10 reduction of 6 or greater.

16. A method according to claim 14, wherein the synergistic combination of TTPC and sodium hypochlorite is configured to provide a complete kill of *Desulfovibrio vulgaris* and *Enterobacter aerogenes* in the aqueous system.

* * * * *